(12) United States Patent
Walters

(10) Patent No.: US 7,816,418 B2
(45) Date of Patent: Oct. 19, 2010

(54) UNIVERSAL PRIMER

(75) Inventor: David N. Walters, Slippery Rock, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 484 days.

(21) Appl. No.: 11/468,831

(22) Filed: Aug. 31, 2006

(65) Prior Publication Data

US 2008/0058439 A1    Mar. 6, 2008

(51) Int. Cl.
- C03C 25/10 (2006.01)
- C08J 3/28 (2006.01)
- C08F 2/46 (2006.01)
- C08F 2/48 (2006.01)
- B05D 3/06 (2006.01)
- B05D 7/02 (2006.01)
- B05D 7/14 (2006.01)

(52) U.S. Cl. .......... 522/96; 522/127; 522/132; 522/184; 427/355; 427/407.1; 427/412.4; 427/508

(58) Field of Classification Search .......... 522/96, 522/127, 132, 184; 106/31.06, 41.35, 287.28; 427/355, 407.1, 412.4, 508
See application file for complete search history.

(56) References Cited

U.S. PATENT DOCUMENTS

| 4,330,446 A * | 5/1982 | Miyosawa ................ 523/409 |
| 4,634,602 A | 1/1987 | Sirkoch et al. ............. 427/44 |
| 4,880,849 A * | 11/1989 | Poole et al. .................. 522/10 |
| 5,082,914 A * | 1/1992 | Cook et al. ................. 527/300 |
| 5,180,766 A * | 1/1993 | Hayama et al. ............. 524/315 |
| 5,397,602 A * | 3/1995 | Martz et al. ............... 427/393.5 |
| 5,480,939 A * | 1/1996 | Jackson et al. ............... 525/120 |
| 6,838,177 B2 * | 1/2005 | Fenn et al. .................. 428/414 |
| 2002/0107298 A1 * | 8/2002 | Al-Akhdar et al. ............. 522/7 |
| 2004/0236053 A1 * | 11/2004 | Chisholm et al. ........ 526/329.7 |
| 2006/0013958 A1 | 1/2006 | Connelly et al. ............. 427/402 |
| 2007/0173600 A1 * | 7/2007 | Eggers et al. ............... 524/589 |
| 2008/0000383 A1 * | 1/2008 | Nagai et al. ............... 106/14.44 |

FOREIGN PATENT DOCUMENTS

| EP | 406855 A2 * | 1/1991 |
| GB | 1 139 433 A | 1/1969 |
| JP | 02305880 A * | 12/1990 |
| WO | 90/03988 A | 4/1990 |
| WO | 2005/100494 | 10/2005 |

OTHER PUBLICATIONS

English abstract translation of JP 02305880 A.*
Limé, F.; Irgum, K. Macromolecules 2007, 40, 1962-1968. American Chemical Society, 2007.*
Lin, C. I.; Joseph, A. K.; Chang, C. K.; Lee, Y. D. Biosensors and Bioelectronics, 2004, 20, 127-131. Elsevier B. V. 2004.*
Adhesion Promoters Product Selection Guide, Sartomer, Sep. 8, 2009.*
Chemical Abstracts + Indexes, American Chemical Society, Columbus, US, Mar. 20, 1989, XP000158907 ISSN: 0009-2258 110:96789c Halogenated polyolefin-acrylic polyurethane adhesives for plastic moldings.

* cited by examiner

Primary Examiner—Mark Eashoo
Assistant Examiner—Michael Pepitone
(74) Attorney, Agent, or Firm—Diane R. Meyers; Steven W. Hays; Alka A. Patel

(57) ABSTRACT

A radiation-curable composition comprising a radiation-curable compounds a free acid and a halogenated polyolefin is disclosed. The compositions are useful in the repair of damaged motor vehicle body parts.

7 Claims, No Drawings

UNIVERSAL PRIMER

FIELD OF THE INVENTION

The present invention relates to primer compositions that are useful in the refinishing of motor vehicles.

BACKGROUND OF THE INVENTION

In the refinishing of automobiles and trucks, a primer is usually applied to the surface being repainted before application of a finishing or topcoat. The primer is formulated such that it promotes good adhesion to the substrate and to the topcoat. However, modern motor vehicles have parts made of different materials. For example, areas such as the hood and trunk decks that are not subject to a corrosive environment may be made from cold rolled steel, whereas fenders and quarter panels which are subject to road salt and other corrosive conditions are made from galvanized steel. Still other parts of the motor vehicle such as bumpers and fascia are made from plastic. It has been difficult to formulate a primer composition that adheres well to all types of substrates. Further, it is important that a primer composition cure at low temperature since most refinish body shops do not have ovens to heat the coating. Also, most plastic substrates cannot tolerate high temperatures.

Therefore, it is desirable to have a universal primer composition that can be applied to substrates comprising mixed metals and plastic and which can be cured at low temperature providing good adhesion to such substrates and to topcoats applied to the primer.

SUMMARY OF THE INVENTION

The present invention provides a radiation-curable composition comprising:
(a) a radiation-curable compound,
(b) a free acid, and
(c) a halogenated polyolefin.

The invention also provides a method of coating a substrate that comprises at least one metal and plastic comprising applying the radiation-curable composition to the substrate, exposing the coated substrate to a source of ultraviolet radiation to cure the composition and applying a topcoat to the cured composition.

DETAILED DESCRIPTION

Examples of suitable radiation-curable compounds include polyacrylates such as diacrylates and triacrylates. Specific examples include hexanediol diacrylate or tripropyleneglycol diacrylate, triacrylates such as trimethylolpropane triacrylate, alkoxylated trimethylolpropane triacrylate or pentaerythritol triacrylate, polyacrylates such as pentaerythritol tetraacrylate or dipentaerythritol hexaacrylate, epoxy acrylates obtained for example by reacting epoxides with acrylic acid such as UVE 100 and UVE 150 available from Croda or Actilane 320 or Actilane 330 available from Akcros Chemicals, or unsaturated polyesters such as polyesters prepared with maleic anhydride as one of the monomeric components. Preferably the primer contains 50-80% by weight, more preferably 60 to 70% by weight based on resin solids of the curable composition.

The composition of the invention is particularly useful as a primer for motor vehicles. The radiation-curable compound is meant to include mixtures of radiation polymerizable compounds including those mentioned above and preferably a radiation polymerizable compound that contains a urethane moiety and is preferably a urethane polyacrylate. More preferably, the radiation-curable compound contains a urethane diacrylate. The urethane polyacrylates are typically prepared by reacting an isocyanate-functional compound with a hydroxyl-functional acrylate. The urethane polyacrylate typically is present in amounts of 50 to 100, preferably 60 to 80 percent by weight based on total weight of the radiation polymerizable compound.

The polyisocyanate that is reacted with the hydroxy functional acrylate can be any organic polyisocyanate. The polyisocyanate may be aromatic, aliphatic, cycloaliphatic, or heterocyclic and may be unsubstituted or substituted. Many such organic polyisocyanates are known, examples of which include: toluene-2,4-diisocyanate, toluene-2,6-diisocyanate, and mixtures thereof; diphenylmethane-4,4'-diisocyanate, diphenylmethane-2,4'-diisocyanate and mixtures thereof; o-, m- and/or p-phenylene diisocyanate; biphenyl diisocyanate; 3,3'-dimethyl-4,4'-diphenylene diisocyanate; propane-1,2-diisocyanate and propane-1,3-diisocyanate; butane-1,4-diisocyanate; hexane-1,6-diisocyanate; 2,2,4-trimethylhexane-1,6-diisocyanate; lysine methyl ester diisocyanate; bis(isocyanatoethyl)fumarate; isophorone diisocyanate; ethylene diisocyanate; dodecane-1,12-diisocyanate; cyclobutane-1,3-diisocyanate; cyclohexane-1,2-diisocyanate, cyclohexane-1,3-diisocyanate, cyclohexane-1,4-diisocyanate and mixtures thereof; methylcyclohexyl diisocyanate; hexahydrotoluene-2,4-diisocyanate; hexahydrotoluene-2,6-diisocyanate and mixtures thereof; hexahydrophenylene-1,3-diisocyanate; hexahydrophenylene-1,4-diisocyanate and mixtures thereof; perhydrodiphenylmethane-2,4'-diisocyanate, perhydrodiphenylmethane-4,4'-diisocyanate and mixtures thereof; 4,4'-methylene bis(isocyanato cyclohexane) available from Mobay Chemical Company as Desmodur W; 3,3'-dichloro-4,4'-diisocyanatobiphenyl, tris(4-isocyanatophenyl)methane; 1,5-diisocyanatonaphthalene, hydrogenated toluene diisocyanate; 1-isocyanatomethyl-5-isocyanato-1,3,3-trimethylcyclohexane and 1,3,5-tris(6-isocyanatohexyl)-biuret.

Examples of hydroxyl-functional acrylates which can be reacted with the polyisocyanate polyurethanes to form the urethane acrylates include: 2-hydroxyethyl(meth)acrylate; glycerol di(meth)acrylate; the (meth)acrylates of the glycidyl ethers of butanol, bisphenol-A, butanediol, diethylene glycol, trimethylolpropane and other mono-, di-, tri- and polyhydric alcohols; the (meth)acrylates of epoxides such as styrene oxide, 1-hexane oxide, 1-decene oxide, 1-butene oxide; the (meth)acrylates of epoxidized fatty acids such as linoleic and linolenic acid; the (meth)acrylates of epoxidized linseed and soya oils; 2- and 3-hydroxypropyl(meth)acrylate, 4-hydroxybutyl(meth)acrylate; and halogenated hydroxyalkyl acrylates such as 3-chloro-2-hydroxypropyl(meth)acrylate; 3-bromo-2-hydroxypropyl(meth)acrylate; 2-chloro-1-(hydroxymethyl)ethyl(meth acrylate, and 2-bromo-1-(hydroxymethyl) ethyl(meth)acrylate. Wherever used in the specification and claims herein, it is to be understood that the term "acrylate" is intended to include "methacrylate" and may be expressed as (meth)acrylate.

Other useful hydroxyl-functional compounds having ethylenic unsaturation that can be reacted with the polyisocyanate include allyl alcohol and derivatives thereof.

It should be understood that the hydroxyl-functional acrylates and the polyisocyanates can be prereacted to form an isocyanate-functional acrylate that is then reacted with a polyol to form the polyurethane polyacrylate. Similarly, isocyanate-functional acrylates such as isocyanato ethyl acrylate can be reacted with a polyol to form the polyurethane polyacrylate. Further, other ethylenically unsaturated isocyanate-functional compounds such as vinyl isocyanate and allylisocyanate can be reacted with a polyol to form an ethylenically unsaturated polyurethane.

Examples of polyols are simple diols, triols, and higher hydric alcohols. Specific examples include 1,3-propanediol, 1,2-butanediol, 1,3-butanediol, 1,4-butanediol, 2,3-butanediol, 2,2,4-trimethyl-1,3-pentanediol, 1,5-pentanediol, 2,4-pentanediol, 1,6-hexanediol, 2,5-hexanediol, 1,7-heptanediol, 2,4-heptanediol, 1,8-octanediol, 1,9-nonanediol, 4,5-nonanediol, 1,10-decanediol, 1,9-decanediol, 2-methyl-1,3-pentanediol, 2-methyl-2,4-pentanediol, 2-ethyl-1,3-hexanediol, 2,2-dimethyl-1,3-propanediol, 2-ethylbutane-1,4-diol, 2,2-diethylpropane-1,3-diol, 2,2-dimethylpropane-1,3-diol, 3-methyl-pentane-1,4-diol, 2,2-diethylbutane-1,3-diol, 1,1,1-trimethylolpropane, trimethylolethane, 1,4-cyclohexanediol, 1,4-cyclohexanedimethanol, 1,2-bis(hydroxymethyl)cyclohexane, 1,2-bis(hydroxyethyl)cyclohexane, ethylene glycol, diethylene glycol, triethylene glycol, propylene glycol, dipropylene glycol, neopentyl glycol, glycerol, pentaerythritol, erythritol, sorbitol, mannitol, and the like. Ethylenically unsaturated polyhydric alcohols such as 2-butene-1,4-diol may be used alone or in admixture with the saturated polyhydric alcohols. Of course, mixtures of saturated polyhydric alcohols or mixtures of unsaturated polyhydric alcohols may be employed.

The radiation polymerizable may contain a polythiol compound that improves the surface hardness of the cured coating. Examples include pentaerythritol tetrakis mecaptopropionate, trimethylolpropane tris thioglycolate. Also polymeric polythiols can be used. Examples are hydroxyl functional oligomer or polymer such as polyester polyols and hydroxyl-functional acrylic copolymers reacted with mercaptopropionic acid or thiol glycolic acid. When present, the polythiol compound is present in amounts of 2 to 30, preferably 5-25 percent by weight based on total weight of the radiation polymerizable compound The radiation-curable composition typically contains a photoinitiator that consists of any photoinitiators that are capable of generating free radicals when exposed to UV radiation. A preferred class of photoinitiator is bis acyl phosphine oxides, for example Irgacure 819 available from Ciba.

Preferably the radiation-curable composition contains 1-3% by weight of photoinitiator based on weight of resin solids of the radiation-curable composition.

The radiation-curable composition contains a free acid that promotes adhesion to metals. The term "free acid" is meant to encompass organic and/or inorganic acids that are included as a separate component of the compositions of the present invention as opposed to any acids that are used in forming any of the components present in the radiation-curable compositions or are present as an impurity with such components or are somehow released when such components react. In certain embodiments, the free acid included within the coating compositions of the present invention is selected from tannic acid, gallic acid, phosphoric acid, phosphorous acid, citric acid, malonic acid, or derivatives thereof, or mixtures thereof. Suitable derivatives include esters, amides, and/or metal complexes of such acids.

In certain embodiments, the free acid comprises an organic acid, such as tannic acid, i.e., tannin. Tannins are extracted from various plants and trees that can be classified according to their chemical properties as (a) hydrolyzable tannins, (b) condensed tannins, and (c) mixed tannins containing both hydrolyzable and condensed tannins. Tannins useful in the present invention include those that contain a tannin extract from naturally occurring plants and trees, and are normally referred to as vegetable tannins. Suitable vegetable tannins include the crude, ordinary or hot-water-soluble condensed vegetable tannins, such as Quebracho, mimosa, mangrove, spruce, hemlock, gabien, wattles, catechu, uranday, tea, larch, myrobalan, chestnut wood, divi-divi, valonia, summac, chinchona, oak, etc. These vegetable tannins are not pure chemical compounds with known structures, but rather contain numerous components including phenolic moieties such as catechol, pyrogallol, etc., condensed into a complicated polymeric structure.

In certain embodiments, the free acid comprises a phosphoric acid, such as a 100 percent orthophosphoric acid, superphosphoric acid or the aqueous solutions thereof, such as a 70 to 90 percent phosphoric acid solution.

The free acid is present in the radiation-curable composition in an amount ranging from 0.1 to 5.0 weight percent, such as 0.5 to 1.5 weight percent, based on total weight of resin solids present in the composition.

To promote adhesion to plastics, the radiation-curable composition contains a halogenated polyolefin, that is, polyolefins that include one or more other halogen atoms, such as fluorine, chlorine, bromine, or iodine. Chlorinated polyolefins or CPOs are preferred.

CPOs suitable for use in the composition applied by the first application technique in certain methods of the present invention may, in certain embodiments, have a weight average molecular weight ranging from about 10,000 to about 150,000, such as about 20,000 to about 125,000, such as about 25,000 to about 105,000, as determined by gel permeation chromatography using a polystyrene standard. Examples of suitable CPOs are disclosed in U.S. Pat. Nos. 6,593,423; 4,997,882; 5,319,032; and 5,397,602, herein incorporated by reference. Suitable CPOs for use in the methods and systems of the present invention include materials commercially available from Eastman Chemical Products, Inc., of Rochester, N.Y. For example, CPOs available from Eastman Chemicals under the names CP153-2, CP164-1, CP343-1, CP343-3 and CP515-2 may be used. In addition, the Hardlen® CPO adhesion promoters available from Toyo Kasai Kogyo Co., Ltd., of Osaka, Japan may be used.

Preferably, the halogenated polyolefin is modified by grafting a compatibilizing material such as an acrylic monomer onto the polyolefin. As used herein, the term "compatibilizing material" refers to moieties that modify a halogenated polyolefin so as to render the halogenated polyolefin compatible with the radiation-curable compound. By "compatible" it is meant herein that the halogenated polyolefin and the radiation-curable compound do not separate from each other in the composition.

Particular examples of acrylic monomers that may be grafted onto a halogenated polyolefin to produce a modified halogenated polyolefin suitable for use in the present invention include, without limitation, acrylic acid, methacrylic acid, and esters thereof, such as acrylates and methacrylates. Useful esters of acrylic or methacrylic acid include straight chain or branched alkyl or hydroxyalkyl esters of acrylic or methacrylic acid. Useful alkyl esters can contain about 1 to about 24 carbon atoms, and preferably contain about 1 to about 18 carbon atoms. Non-limiting examples of alkyl esters include methyl(meth)acrylate, ethyl(meth)acrylates, propyl (meth)acrylates, butyl(meth)acrylates, pentyl(meth)acrylates, hexyl(meth)acrylates, heptyl(meth)acrylates, octyl (meth)acrylates, nonyl(meth)acrylates, decyl(meth) acrylates, dodecyl(meth)acrylates, tetradecyl(meth) acrylates, hexadecyl(meth)acrylates, ethylhexyl(meth) acrylates, lauryl(meth)acrylates, stearyl(meth)acrylates and 2-ethylhexyl(meth)acrylate. Suitable hydroxyalkyl esters include 2-hydroxyethyl(meth)acrylate, 2-hydroxypropyl (meth)acrylate, 3-hydroxypropyl(meth)acrylate and hydroxybutyl(meth)acrylate. As used herein, "(meth)acrylate" and terms derived therefrom are intended to include both acrylate and methacrylate.

In certain embodiments, modified halogenated polyolefins suitable for use in the methods and systems of the present invention may be produced by an atom transfer radical polymerization process (ATRP), such as is described in U.S. Pat. No. 6,576,722 at col. 3, line 61, to col. 10, line 17, which is incorporated herein by reference.

In certain embodiments, modified halogenated polyolefins suitable for use in the methods and systems of the present invention may be produced by conventional free radical polymerization methods that will be understood by those skilled in the art. See Kirk-Othmer Encyclopedia of Chemical Technology, Vol. 1 (1963). As will be understood by the skilled artisan, such radical polymerization is typically conducted in a solution of organic solvent(s). For example, aromatic solvents, such as toluene, xylene and SOLVESSO 100 may be used. Moreover, conventional radical reaction initiators may be used, such as peroxides, including benzoyl peroxide, lauroyl peroxide, t-butyl hydroperoxide, and t-butylperoxy-2-ethylhexanoate; and azo compounds, including azobisvaleronitrile, azobisisobutylronitrile and azobis(2-methylpropionitrile).

It will be appreciated by the skilled artisan that the compounds produced by a conventional free radical polymerization process will typically comprise a mixture of polymers. For example, when grafting an acrylic monomer onto a CPO by conventional free radical polymerization, the random nature of standard radical polymerization will likely produce a resin composition comprising a mixture of non-graft CPO chains, acrylic polymers, and CPOs having an acrylic monomer grafted thereon. Nevertheless, such a polymerization will produce at least some of the modified halogenated polyolefins that may be used in the methods and systems of the present invention. Thus, in certain embodiments, the adhesion-promoting agent comprises a mixture of a halogenated polyolefin, an acrylic polymer, and a modified halogenated polyolefin. In these embodiments, the modified halogenated polyolefin may, for example, comprise 1 to 75 percent by weight based on the total weight of the mixture of polymers. In such embodiments, the amount of modified halogenated polyolefin that may be present in the mixture can range between any combination of the recited values, inclusive of the recited values.

The halogenated polyolefin including the modified material generally comprises 1 to 10 percent by weight or, in some embodiments, 1 to 5 percent by weight, or, in yet other embodiments, 1 to 2 percent by weight of the radiation-curable composition based on weight of total resin solids present in the composition.

The radiation-curable composition may also comprise an organic solvent. Suitable organic solvents include, without limitation, xylene, toluene, Aromatic 100 solvent, which is commercially available from Cumberland Products, Inc., Hodgenville, Ky., and alcohols, such as ethyl alcohol, propyl alcohol and diacetone alcohol, including mixtures thereof.

The organic solvent typically comprises 0 to 75, preferably 0 to 50 percent by weight based on total weight of the radiation-curable composition.

The radiation-curable composition usually contains a pigment or filler. In principle any known pigment or filler can be used. Conventional pigments such as titanium dioxide and zinc oxide can be included. Suitable fillers include clays, barytes, mica, talcs and calcium carbonate. The compositions can include those pigments that are known to inhibit corrosion such as strontium chromate, zinc phosphate and barium metaborate.

Preferred pigments and fillers are those that do not interfere substantially with the radical cure. Preferably the pigment consists principally of zinc sulphide, barium sulphate, china clay and corrosion inhibiting pigments. More preferably the pigment consists principally of china clay and corrosion inhibiting pigments. China clay is hydrated aluminium silicate obtained from sedimentary kaolin clays. An example of a suitable china clay is Speswhite china clay available from ECC International.

The types and levels of pigments are chosen principally in order to achieve good sandability and corrosion resistance. Preferably the levels and types of pigments and fillers are chosen to achieve a pigment volume concentration (PVC) of 10-50%, more preferably 15-25%. The PVC is the ratio of the volume of pigment to the total volume of non-volatile material present in the whole composition expressed as a percentage.

The radiation-curable composition may also contain conventional additives such as adhesion promoters, pigment dispersants, flow aids, wetting aids and rheology modifiers. When present, these ingredients constitute no more than 20% by weight of the composition based on total weight of the composition.

The radiation-curable compositions can be applied over a wide variety of metals and plastics. Examples of suitable metallic substrates can include ferrous metals and non-ferrous metals. Suitable ferrous metals include iron, steel, and alloys thereof. Non-limiting examples of useful steel materials include cold-rolled steel, galvanized (zinc coated) steel, electrogalvanized steel, stainless steel, pickled steel, GALVANNEAL®, GALVALUME®, and GALVAN® zinc-aluminum alloys coated upon steel, and combinations thereof. Useful non-ferrous metals include aluminum, zinc, magnesium and alloys thereof. Combinations or composites of ferrous and non-ferrous metals can also be present.

Examples of plastic substrates are EVA (ethyl vinyl acetate) foam; polyurethane; fiberglass reinforced plastic; plastic including thermoplastic and/or thermoset materials as known to those in the art, and as described below. Polyurethane substrates include aromatic, aliphatic and hybrid (hybrid examples are silicone polyether or polyester urethane and silicone carbonate urethane). The polyurethane may be thermosetting such as associated with reaction injection molding materials (RIM) or may be thermoplastic such as polyester or polyether based thermoplastic urethanes. By "plastic" is meant the EVA and polyurethanes mentioned above and any of the common thermoplastic or thermosetting synthetic materials, including thermoplastic olefins ("TPO") such as polyethylene and polypropylene and blends thereof thermoplastic urethane, polycarbonate, sheet molding compound, reaction-injection molding compound, acrylonitrile-based materials, nylon, and the like. A particular plastic is TPO that comprises polypropylene and EPDM (ethylene propylene diene monomer).

The radiation-curable compositions of the present invention can be applied to the substrates mentioned above by any of the conventional coating techniques such as, for example, brushing, spraying, dipping or flowing. Any of the known spray techniques can be employed such as compressed air spraying, electrostatic spraying including either manual or automatic methods. In certain embodiments, the coating composition is applied such that a dry film thickness in the range of 20 to 200 microns (0.8 mils to 8.0 mils) is obtained.

The primer composition is cured by exposure to UV radiation. When several applications are used, the primer can be cured after each application or only after the final application. The ratio of UV-B content to UV-A content of the radiation is preferably 1:1 or less. More preferably, the UV-B to UV-A ratio is 0.2:1 or less, most preferably 0.05:1 or less and even more preferably 0.025:1 or less. The radiation preferably has substantially no UV-C content. UV-A radiation is any radiation falling within the 320-400 nm wavelength interval, UV-B radiation is any radiation falling within the 280-320 nm wavelength and UV-C radiation is any radiation falling within the 100-280 nm wavelength interval.

The radiation may be provided by any suitable UV lamp and preferably the lamp(s) are positioned so that they are between 5 and 60 cm away from the surface of the primer. More preferably the lamp(s) are positioned so that they are from 10 to 30 cm away from the surface of the primer.

Preferably the primer is exposed to the UV radiation for from 30 seconds to 10 minutes, more preferably from 1 to 3 minutes.

The primer can be sanded using sand- or glasspaper prior to topcoating.

The primer may be topcoated with any suitable refinish system in order to achieve the desired final color and appearance. For example the primer can be coated with a waterborne basecoat such as available from PPG Industries under the trademark ENVIROBASE followed by a solventborne two-pack polyurethane clearcoat such as GLOBAL D893 available from PPG Industries. Alternatively it can be topcoated with a solventborne basecoat such as GLOBAL BC 9700 available from PPG Industries followed by a solventborne two-pack polyurethane clearcoat such as DELTRON DCU 2042 available from PPG Industries. Alternatively it can be topcoated with a solventborne single layer two-pack polyurethane topcoat such as CONCEPT COLOR DCC 9300 available from PPG Industries.

The invention will now be illustrated by means of the following examples.

EXAMPLES

Illustrating the invention are the following examples that are not to be considered as limiting the invention to their details. All parts and percentages in the examples, as well as throughout the specification, are by weight unless otherwise indicated.

A urethane polyacrylate suitable for use in the present invention was prepared by equipping a 12-liter reactor vessel with a stirring blade, nitrogen inlet, and one feed inlet. Charge 1 (see below) was added to the vessel.

| Charge 1 | |
|---|---|
| Component | Weight (g) |
| T-1890[1] | 4125.0 |
| IONOL[2] | 0.8 |
| Dibutyl tin dilaurate | 4.1 |
| Triphenyl phosphate | 20.3 |

[1]T-1890 is the isocyanurate of isophorone diisocyanate commercially available from Degussa.
[2]IONOL is 2,6-Di-t-Butyl Cresol commercially available from Cognis.

Charge 1 was heated in the reactor to a temperature of 70° C. under a nitrogen blanket. Upon reaching 70° C., Charge B was added over a period of 45 minutes or at a rate to maintain the reaction temperature at no greater than 80° C.

| Charge B | |
|---|---|
| Component | Weight (g) |
| Sartomer SR-9003[3] | 929.6 |
| Hydroxy ethyl acrylate | 929.6 |

[3]Sartomer SR-9003 is a propoxylated neopentyl glycol diacrylate monomer and is commercially available from Sartomer Company, Inc., Exton, PA.

Upon completion of the addition of Charge B, the reaction temperature was maintained at 80° C. for one hour. After the one-hour hold, Charge C was added.

| Charge C | |
|---|---|
| Component | Weight (g) |
| 1,6-Hexanediol | 236.92 |

With the addition of Charge C, the reaction was held until the NCO peak was no longer visible in an IR spectra of the reaction material. After completion of the reaction, Charge D was added.

| Charge D | |
|---|---|
| Component | Weight (g) |
| Sartomer SR-9003 | 808.4 |
| Butyl acetate | 811.8 |

The urethane acrylate had a resin solids content of 61.5% (measured at 1 hour/110° C.) and a Gardner viscosity of W-Z2. The free hydroxyl ethyl acrylate was <0.1%. The polyacrylate described above was used in the preparation of the following coating compositions and is referred to as Acrylate 1.

The following examples illustrate coating compositions according to the present invention. Radiation-curable primer compositions were prepared by dispersing the pigments in the Acrylate 1 binder using a high-speed pneumatic motor equipped with a cowles stirring blade. Photoinitiator, solvent, and additives were then added to the dispersed pigment/acrylate blend as shown in Table 1.

TABLE 1*

| Raw Material | Example 1 | Example 2 | Example 3 | Example 4 |
|---|---|---|---|---|
| Acrylate 1 | 104.7 | 104.7 | 104.7 | 104.7 |
| Propoxylated NPGDA[1] | 8.4 | 8.4 | 8.4 | 8.4 |
| Iron oxide[2] | .3 | .3 | .3 | .3 |
| Talc[3] | 26.1 | 26.1 | 26.1 | 26.1 |
| Barium Sulfate[4] | 7.6 | 7.6 | 7.6 | 7.6 |
| Calcium carbonate[5] | 22.9 | 22.9 | 22.9 | 22.9 |
| Titanium dioxide[6] | 2.6 | 2.6 | 2.6 | 2.6 |
| Phosphate ester acrylate[7] | 5.0 | 5.0 | 5.0 | 5.0 |
| Tannic acid solution[8] | | 6.7 | | 6.7 |
| CPO resin solution[9] | | | 30.0 | 30.0 |

TABLE 1*-continued

| Raw Material | Example 1 | Example 2 | Example 3 | Example 4 |
|---|---|---|---|---|
| Photoinitiator[10] | 3.0 | 3.0 | 3.0 | 3.0 |
| Acetone | 70.0 | 70.0 | 40.0 | 40.0 |
| Total | 250.6 | 257.3 | 250.6 | 257.3 |

*All weights in grams.
[1]Propoxylated neopentyl glycol diacrylate supplied as SR9003 from Sartomer Corp., Exton, PA.
[2]Commercially available as BAYFERROX Black 318M from Bayer Corp. Pittsburgh PA.
[3]Commercially available as MICROTALC MP 15–38 from Barrets Minerals.
[4]Commercially available as 2065 Barium Sulfate from Barrets Minerals.
[5]Commercially available as OMYACARB 3 from OMYA Inc.
[6]Commercially available as R960-38 Titanium dioxide from DuPont Inc.
[7]Phosphoric acid ester acrylate commercially available as CD9052 from Sartomer Corp., Exton, PA.
[8]Prepared by dissolving 15 grams of Tannic acid in 85 grams of acetone.
[9]Prepared according to Example A of U.S. Patent Publication No. 2006/0013958.
[10]Commercially available as DAROCUR 4265 from Ciba Giegy Corp.

The compositions of Examples 1-4 were spray applied to a variety of substrates and cured under an H&S Autoshot 400 watt UV lamp set at a distance of 10 inches for a total of two minutes. The cured primer was then topcoated with D9700 black basecoat, available from PPG Industries and subsequently clearcoated with D893 urethane clearcoat also available from PPG Industries. The test panels with the radiation cured primer, basecoat and clearcoat were then allowed to cure at ambient conditions overnight before testing for adhesion according to ASTM D 3359. The results of the adhesion testing are shown in Table 2 below and are presented as % of the complete coating system adhering to the substrates.

TABLE 2

| Example | Cold Rolled Steel | Electrogalvanized Steel | TPO-Plastic |
|---|---|---|---|
| 1 | 0 | 0 | 0 |
| 2 | 100 | 97 | 0 |
| 3 | 0 | 0 | 100 |
| 4 | 100 | 100 | 100 |

Examples 1, 2 and 3 are comparative compositions. Example 4 is in accordance with the present invention. As can be seen from the test results set forth in Table 2 above, the coating composition according to the present invention provides the best adherence over the variety of substrates.

Examples 5-8

These UV-curable primer compositions may also be augmented by the addition of polythiol functional oligomers and polymers. The addition of these materials increases cure response at the coatings surface and in some instances improves adhesion to various substrates. The following examples were prepared by dispersing pigments in the urethane acrylate binder using a high speed pneumatic motor equipped with a cowles stirring blade. Photoinitiator, solvent, and additives were then added to the dispersed pigment/urethane acrylate blend as shown in Table 3 (all weights are in grams). The thiol functional oligomer was added immediately before application of the coating.

TABLE 3

| Raw Material | Example 5 | Example 6 | Example 7 | Example 8 |
|---|---|---|---|---|
| Urethane acrylate[1] | 104.7 | 104.7 | 104.7 | 104.7 |
| Propoxylated NPGDA[2] | 8.4 | 8.4 | 8.4 | 8.4 |

TABLE 3-continued

| Raw Material | Example 5 | Example 6 | Example 7 | Example 8 |
|---|---|---|---|---|
| Iron oxide[3] | .3 | .3 | .3 | .3 |
| Talc[4] | 26.1 | 26.1 | 26.1 | 26.1 |
| Barium Sulfate[5] | 7.6 | 7.6 | 7.6 | 7.6 |
| Calcium carbonate[6] | 22.9 | 22.9 | 22.9 | 22.9 |
| Titanium dioxide[7] | 2.6 | 2.6 | 2.6 | 2.6 |
| Phosphate ester acrylate[8] | 5.0 | 5.0 | 5.0 | 5.0 |
| Tannic acid solution[9] | | 6.7 | | 6.7 |
| CPO resin solution[10] | | | 30.0 | 30.0 |
| Photoinitiator[11] | 3.0 | 3.0 | 3.0 | 3.0 |
| Acetone | 70.0 | 70.0 | 40.0 | 40.0 |
| Pentaerythritol tetrakis mercaptopropionate | 10 | 10 | 10 | 10 |
| Total | 260.6 | 267.3 | 260.6 | 267.3 |

[1]Proprietary urethane acrylate solution produced by PPG Industries Inc., Pittsburgh PA.
[2]Propoxylated neopentyl glycol diacrylate supplied as SR9003 from Sartomer Corp., Exton, PA.
[3]Supplied as Bayferrox Black 318M from Bayer Corp., Pittsburgh PA.
[4]Supplied as Microtalc MP 15–38 from Barrets Minerals.
[5]Supplied as 2065 Barium Sulfate from Barrets Minerals.
[6]Supplied as Omyacarb 3 from OMYA Inc.
[7]Supplied as R960-38 Titanium dioxide from DuPont Inc.
[8]Phosphoric acid ester CD9052 from Sartomer Corp., Exton, PA.
[9]Prepared by dissolving 15 grams of Tannic acid in 85 grams of acetone.
[10]Prepared according to Example A of U.S. Patent Publication No. 2006/0013958.
[11]Supplied as Darocur 4265 from Ciba Geigy Corp.

The UV curable primer compositions were spray applied to a variety of substrates and cured under an H&S Autoshot 400 watt UV lamp set at a distance of 10 inches for a total of two minutes. The cured primer was then topcoated with D9700 black basecoat, available from PPG Industries, Inc. and clearcoated with D893 urethane clearcoat also available from PPG Industries, Inc. The test panels with UV cured primer, basecoat and clearcoat were then allowed to cure at ambient conditions overnight before testing for adhesion according to ASTM D3359. The results of the adhesion testing are shown in Table 4 and are presented as % of the complete coating system adhering to the substrates.

TABLE 4

| Example | Cold Rolled Steel | Electrogalvanized Steel | TPO-Plastic |
|---|---|---|---|
| 5 | 50 | 50 | 0 |
| 6 | 100 | 100 | 0 |
| 7 | 0 | 0 | 100 |
| 8 | 100 | 100 | 100 |

Whereas particular embodiments of this invention have been described above for purposes of illustration, it will be evident to those skilled in the art that numerous variations of the details of the present invention may be made without departing from the invention as defined in the appended claims.

What is claimed is:

1. In a radiation-curable coating composition comprising:
50 to 80 percent by weight a radiation-curable compound, the improvement comprising including in the coating composition
1 to 5 percent by weight a free acid, wherein the free acid is selected from tannic acid, phosphoric acid, gallic acid and/or citric acid;
1 to 10 percent by weight of a halogenated polyolefin;
1 to 3 percent by weight of a photoinitiator; and
a phosphate ester acrylate;

so as to improve the adhesion of the coating composition to both metal and plastic substrates; the percentages by weight being based on weight of total resin solids in the composition.

2. The composition of claim 1 wherein the composition further comprises 5 to 25 percent by weight based on total weight of the radiation curable compound of a polythiol to improve the surface hardness of a cured coating derived from the coating composition.

3. The composition of claim 1 in which the free acid is tannic acid.

4. In a radiation-curable coating composition comprising:
   50 to 80 percent by weight of a radiation-curable compound comprising a urethane polyacrylate,
   1 to 5 percent by weight of tannic acid;
   1 to 10 percent by weight of a chlorinated polyolefin;
   1 to 3 percent by weight of a photoinitiator; and
   a phosphate ester acrylate;
so as to improve the adhesion of the coating composition to both metal and plastic substrates; the percentages by weight being based on weight of total resin solids in the coating composition and also including in the coating composition
   5 to 25 percent by weight of a polythiol based on total weight of the radiation-curable compound to improve the surface hardness of a cured coating derived from the coating composition.

5. A method of applying a coating composition to a substrate, which comprises both metal and plastic, the method comprising:
   (a) applying the radiation-curable composition of claim 1 to the substrate, and
   (b) curing the composition by ultraviolet radiation.

6. The method of claim 5 wherein the radiation-curable composition is applied to a substrate selected from metal, a plastic selected from thermoplastic polyolefin, thermosetting polyurethane, thermoplastic polyurethane and EPDM.

7. The method of claim 5 further comprising applying a protective or decorative coating over the cured composition of step (b).

* * * * *